United States Patent [19]

Cleveland et al.

[11] Patent Number: 5,555,006
[45] Date of Patent: Sep. 10, 1996

[54] INKJET PRINTING: MASK-ROTATION-ONLY AT PAGE EXTREMES; MULTIPASS MODES FOR QUALITY AND THROUGHPUT ON PLASTIC MEDIA

[75] Inventors: Lance Cleveland, San Diego; Corrina A. E. Hall, Escondido; William C. Hilliard, San Diego, all of Calif.

[73] Assignee: Hewlett-Packard Company, Palo Alto, Calif.

[21] Appl. No.: 57,366

[22] Filed: Apr. 30, 1993

[51] Int. Cl.⁶ .................................................. B41J 2/145
[52] U.S. Cl. ................................................ 347/41; 347/37
[58] Field of Search ....................................... 347/9, 12, 15, 347/41, 104, 180, 181, 182

[56] References Cited

U.S. PATENT DOCUMENTS

| | | |
|---|---|---|
| 4,748,453 | 5/1988 | Lin . |
| 4,963,882 | 10/1990 | Hickman ........................... 347/41 |
| 4,965,593 | 10/1990 | Hickman . |
| 4,967,203 | 10/1990 | Doan et al. ......................... 347/41 |
| 4,975,780 | 12/1990 | Kuboki ............................ 347/104 |
| 5,079,571 | 1/1992 | Eriksen . |
| 5,239,312 | 8/1993 | Merna et al. ...................... 347/41 |
| 5,430,469 | 12/1993 | Tamura . |

FOREIGN PATENT DOCUMENTS

| | | | |
|---|---|---|---|
| 2070355 | 12/1992 | Canada ................................ 347/12 |
| 0517519 | 12/1992 | European Pat. Off. ......... B41J 2/205 |
| 3251468 | 2/1992 | Japan ............................ B41J 2/525 |
| 4-361049 | 12/1992 | Japan ................................ 347/41 |
| 4-366645 | 12/1992 | Japan ................................ 347/41 |

Primary Examiner—John E. Barlow, Jr.

[57] ABSTRACT

Images are printed using marks formed in pixel arrays by a scanning print head. For transparent and glossy media, with poor absorbance, drying is enhanced by a multipass (preferably six-pass) print mode in which the total number of ink drops or spots is allocated among correspondingly multiple masks, though some may be duplicates. To further hasten drying, heat is applied—through the medium, from the opposite side as that on which ink is deposited—but the amount of heat is strictly moderated, particularly for non-transparent glossy media, to accommodate the hypersensitivity of these media to heat-induced warping. Heating for glossy media is preferably restricted to about one-third the power used for drying plain paper. Convective drying too is promoted, by operating a fan over the printed image. Certain special techniques well-suited for plain-paper printing have been found undesirable for use with plastic media; these techniques include so-called "resolution-enhanced technology", bidirectional printing (particularly of black), and optical-density controlled printing speed. At top and bottom of each page or sheet of printing medium, where it is undesirable to operate with the pen partly off the edge of the sheet, and where also the printing medium is constrained from only one direction rather than being held taut beneath the pen, the print mask is rotated while the printing medium is held stationary—thereby entirely avoiding reliance upon accuracy of print-medium advance.

17 Claims, 2 Drawing Sheets

FIG. 1

INKJET PRINTING: MASK-ROTATION-ONLY AT PAGE EXTREMES; MULTIPASS MODES FOR QUALITY AND THROUGHPUT ON PLASTIC MEDIA

RELATED PATENT DOCUMENTS

Three closely related documents are other, co-owned U.S. utility-patent applications filed in the United States Patent and Trademark Office substantially contemporaneously with this document—and also hereby incorporated by reference in its entirety into this document. One is in the names of Ronald A. Askeland et al., and utility-patent application serial 08/056,263, issued as U.S. Pat. No. 5,485,180 on Jan 16, 1996. Another such document is in the names of Gregory D. Raskin, utility-patent application serial 08/055,658, issued as U.S. Pat. No. 5,519,415 on May 21, 1996. A third related document is in the names of Broder et al., and utility-patent application serial 08/057,36, now abandoned.

BACKGROUND

1. Field of the Invention

This invention relates generally to machines and procedures for printing text or graphics on printing media such as paper, transparency stock, or other glossy media; and more particularly to a scanning thermal-inkjet machine and method that construct text or images from individual ink spots created on a printing medium, in a two-dimensional pixel array. The invention employs print-mode techniques to optimize image quality (primarily on transparent and glossy media) vs. operating time, and also to minimize image distortion (primarily on paper) imposed by an ink-drying heater.

2. Prior Art

To achieve vivid colors in inkjet printing with aqueous inks, and to substantially fill the white space between addressable pixel locations, ample quantities of ink must be deposited. Doing so, however, requires subsequent removal of the water base—by evaporation (and, for some printing media, absorption)—and this drying step can be unduly time consuming.

In addition, if a large amount of ink is put down all at substantially the same time, within each section of an image, related adverse bulk-colorant effects arise: so-called "bleed" of one color into another (particularly noticeable at color boundaries that should be sharp), "blocking" or offset of colorant in one printed image onto the back of an adjacent sheet with consequent sticking of the two sheets together (or of one sheet to pieces of the apparatus or to slipcovers used to protect the imaged sheet), and "cockle" or puckering of the printing medium. Various techniques are known for use together to moderate these adverse drying-time effects and bulk- or gross-colorant effects.

(a) Prior heat-application techniques—Among these techniques is heating the inked medium to accelerate evaporation of the water base or carrier. Heating, however, has limitations of its own; and in turn creates other difficulties due to heat-induced deformation of the printing medium.

Glossy stock warps severely in response to heat, and transparencies too can tolerate somewhat less heating than ordinary paper. Accordingly, heating has provided only limited improvement of drying characteristics for these plastic media.

As to paper, the application of heat and ink causes dimensional changes that affect the quality of the image or graphic. Specifically, it has been found preferable to precondition the paper by application of heat before contact of the ink; if preheating is not provided, so-called "end-of-page handoff" quality defects occur—this defect takes the form of a straight image-discontinuity band formed across the bottom of each page when the page bottom is released.

Preheating, however, causes loss of moisture content and resultant shrinking of the paper fibers. To maintain the paper dimensions under these circumstances the paper is held in tension by a system of pinchwheels used in conjunction with paper-advance drivewheels.

Unfortunately these provisions have their maximum effect, in preventing image-quality defects, only while the paper is constrained by the wheels. As soon as the bottom of the page has been printed and the paper leaves the constraint of the wheels, the paper contracts.

This happens very quickly, and as it does the paper and the dots of ink on it move in at the edges and up in the center. The quality defect caused by this sudden releasing of stress can be identified as an "end-of-page paper-shrink defect"; it appears as a thin arched gap of reduced color density.

Prior efforts to eliminate this arched gap have included avoiding the page-long accumulation of stress by cyclically lifting or releasing the constraining force of the pinchwheels. This works to decrease the paper-shrink defect by allowing the internal stress to be released or equalized incrementally—rather than cumulatively.

Unfortunately, however, this cyclical-release technique sacrifices control over paper position at each of the release points along the way. This loss of paper-position control can create numerous misalignment regions that are a greater problem than the paper-shrink defect.

(b) Prior print-mode techniques—Another useful technique is laying down in each pass of the pen only a fraction of the total ink required in each section of the image—so that any areas left white in each pass are filled in by one or more later passes. This tends to control bleed, blocking and cockle by reducing the amount of liquid that is all on the page at any given time, and also may facilitate shortening of drying time.

The specific partial-inking pattern employed in each pass, and the way in which these different patterns add up to a single fully inked image, is known as a "print mode". Heretofore three-pass print modes have been used successfully to reduce bulk-colorant problems on paper—but less successfully on glossy and transparency stock, which are much less absorbent and so rely to a greater extent upon evaporation.

Attempts have also been made to use print modes for hiding the paper-shrink error discussed in subsection (a) above. Heretofore such efforts have had relatively little effectiveness, or have caused still other problems.

For example, some print modes such as square or rectangular checkerboard-like patterns tend to create objectionable moire effects when frequencies, harmonics etc. generated within the patterns are close to the frequencies or harmonics of interacting subsystems. Such interfering frequencies may arise in dithering subsystems sometimes used to help control the paper advance or the pen speed.

Checkerboard print-mode patterns also are subject to objectionable so-called "banding"—horizontal stripes across the finished image. These arise because between each swath the paper advances by substantially the full height of a swath, in effect another type of cumulative-error display.

Print-mode patterns that are instead made up of either mostly all horizontal or mostly all vertical elements can still produce similar interference effects, but only along that direction of the pattern (the direction along which most of the pattern elements are aligned)—and also tend to exaggerate other print-quality defects in the directional lateral to the pattern. Such problems have defeated earlier efforts to find print-mode solutions to the end-of-page paper-shrink problem.

(c) End-of-image print-medium advance errors—Another problem, related to the end-of-page defect introduced above, arises when printing near the beginning or end of a sheet of printing medium—but arises in a somewhat simpler or more mechanical fashion. As suggested earlier, in representative modern printing machines designed for fine resolution and high image quality, the printing medium is generally held taut in the print zone, between two sets of rollers or the like.

This arrangement promotes very high precision and accuracy of printing-medium advance, and thus of printing-medium positioning relative to the pen. Near both longitudinal ends of each sheet or page of printing medium, however, necessarily the medium is held only by one set of rollers etc.

This arrangement leads to relatively less precise positioning of the printing medium in those two regions. This situation may be troublesome in particular when printing near the bottom end of a sheet, as there the sheet is held only by a tensioning roller—which for other reasons is advantageously made rather small in diameter, but such sizing may be adverse to best precision.

One current development (not prior art with respect to the present invention) importantly mitigates that relative diminution of precision by taking smaller steps in the printing-medium advance, particularly near the bottom or end of each page. That system and its benefits are described in the Broder et al. document mentioned earlier; although that system represents a major contribution to attainment of good print quality near the bottom of the page, nevertheless precision is not improved to the level enjoyed in regions where the medium is held taut.

(d) Known technology of print modes: general introduction—One particularly simple way to divide up a desired amount of ink into more than one pen pass is the checkerboard pattern mentioned above: every other pixel location is printed on one pass, and then the blanks are filled in on the next pass.

To avoid the banding problem (and sometimes minimize the moire patterns) discussed above, a print mode may be constructed so that the paper advances between each initial-swath scan of the pen and the corresponding fill-swath scan or scans. In fact this can be done in such a way that each pen scan functions in part as an initial-swath scan (for one portion of the printing medium) and in part as a fill-swath scan.

Once again this technique tends to distribute rather than accumulate print-mechanism error that is impossible or expensive to reduce. The result is to minimize the conspicuousness of—or, in simpler terms, to hide—the error at minimal cost.

For instance a two-pass print mode may start a page by printing with only some of the nozzles in an array of only half of the pen's nozzles, all positioned at one end of the pen—as an example, selected ones of the nozzles consecutively numbered one through fifty, on a hundred-nozzle pen. This first pass may be in a checkerboard pattern—thus actually using, e.g., for example, exclusively odd-numbered nozzles 1, 3, . . . in the first row, and then only even-numbered nozzles 12, 14, . . . in the second row, next selecting only odd-numbered nozzles 21, 23, . . . again in the third row, etc.—and thus printing in half of the pixel locations in the swath area.

The paper then advances by a distance equal to the length of the half-array of nozzles (in other words, the height of fifty nozzles), and the pen would print in both ends of its nozzle array—but again only printing a fifty-percent checkerboard pattern. Now, however, while the forward end of the pen (selected ones of nozzles one through fifty) as before prints on fresh paper, the rearward end (selected ones of nozzles numbered fifty-one through one hundred) fills in the area already printed.

This behavior is then repeated all down the page until the last swath—which is a fill-in swath only, again using selected nozzles of those numbered fifty-one through one hundred.

(e) Space- and sweep-rotated print-mode masks—The pattern used in printing each nozzle section is known as the "print-mode mask". The term "print mode" is more general, usually encompassing a description of a mask, the number of passes required to reach full density and the number of drops per pixel defining "full density".

In the two-pass example above, the second half of the pen (certain ones of nozzles numbered fifty-one through one hundred) filled in the blank spaces left by the first half. For each pass, this may be symbolized using a letter "x" for each pixel that is printed and a letter "o" for each pixel that is not, as follows.

| pattern 1: nozzles 1 through 50 | pattern 2: nozzles 51 through 100 |
|---|---|
| xoxoxoxoxo | oxoxoxoxox |
| oxoxoxoxox | xoxoxoxoxo |
| xoxoxoxoxo | oxoxoxoxox |
| oxoxoxoxox | xoxoxoxoxo |
| xoxoxoxoxo | oxoxoxoxox |

In each of these diagrams, the xs appear in diagonal lines—which are angled, if the vertical and horizontal spacings are the same, at forty-five degrees (to both the columns and rows). These lines of xs represent pixels that are printed (if the desired image calls for anything to be printed in each of those pixels respectively), and the os represent diagonal lines of pixels that are not printed.

To conserve space in this document, the diagrams above represent only eight pixel rows, out of fifty created by each half of the hundred-nozzle pen that is under discussion. The nozzles are laid out along the pen in substantially only one vertical row, one hundred nozzles long—although as a practical mechanical matter they are staggered laterally to permit very close spacing along the vertical axis. Therefore to obtain the checkerboard (or other) patterns described in this document the various nozzles are fired selectively and rapidly many times, in careful synchronism with scanning of the pen across the printing medium—taking into account not only the scanning motion across the page but also the nozzle staggering across the pen.

In the "pattern 1" diagram, one line of xs begins in the upper left-hand corner, and at pixel positions offset by two pixels along both top and left-hand edges of the pattern. In the "pattern 2" diagram, however, it is instead a line of as that begins in the corner, whereas lines of xs begin at positions offset from the corner by just one pixel along the top and left-hand edges—and so fitting between the lines of xs put down by "pattern 1".

Hence these diagrams show that pixel positions left unprinted by the first ("pattern 1") pass are filled in by the second. In other words, looking all the way across any row—and taking into account all the xs formed by both "pattern 1" and "pattern 2" in the aggregate—all positions in the row are filled.

One way to achieve this pattern is to always keep nozzles one through fifty in "pattern 1", and always keep nozzles fifty-one through one hundred in "pattern 2". This is known as "space rotated" masking; using this method to print down the page would progressively produce these patterns—illustrated here too using an abbreviated vertical nozzle-array representation of just eight nozzles rather than one hundred:

| pass 1 | pass 2 | pass 3 | pass 4 | pass 5 |
|--------|--------|--------|--------|--------|
| —      |        |        |        |        |
| \| \|  |        |        |        |        |
| \| \|  |        |        |        |        |
| \| \|  |        |        |        |        |
| xoxo   | oxox   |        |        | ← first printed row |
| oxox   | xoxo   |        |        |        |
| xoxo   | oxox   |        |        |        |
| oxox   | xoxo   |        |        |        |
|        | xoxo   | oxox   |        | ← fifth printed row |
|        | oxox   | xoxo   |        |        |
|        | xoxo   | oxox   |        |        |
|        | oxox   | xoxo   |        |        |
|        |        | xoxo   | oxox   |        |
|        |        | oxox   | xoxo   |        |
|        |        | xoxo   | oxox   |        |
|        |        | oxox   | xoxo   |        |
|        |        |        | xoxo   | oxox   |
|        |        |        | oxox   | xoxo   |
|        |        |        | xoxo   | oxox   |
|        |        |        | oxox   | xoxo   |
|        |        |        |        | \| \|  |
|        |        |        |        | \| \|  |
|        |        |        |        | \| \|  |
|        |        |        |        | —      |

In this mode, the pen uses the same pattern all down the page, but the mask is different in different portions of the pen: "pattern 1" for nozzles one through fifty (represented in the abbreviated drawing by the lower four positions in each eight-nozzle group); vs. "pattern 2" for nozzles number fifty-one through one hundred (represented by the upper four positions in each group).

The availability of this method of masking for various printing devices depends in part on the basic mechanical and firmware architecture of each device. In particular, it depends upon whether the basic operating system provides for efficient addressing of different mask patterns to different segments of the overall nozzle array.

Another way to use the same print mode is to apply one mask pattern to the entire pen, but to change that mask pattern from pass to pass. This is so-called "sweep rotated" masking—still using the same abbreviated representation for purposes of illustration:

| pass 1 | pass 2 | pass 3 | pass 4 | pass 5 |
|--------|--------|--------|--------|--------|
| —      |        |        |        |        |
| \| \|  |        |        |        |        |
| \| \|  |        |        |        |        |
| \| \|  |        |        |        |        |
| xoxo   | oxox   |        |        | ← first printed row |
| oxox   | xoxo   |        |        |        |
| xoxo   | oxox   |        |        |        |
| oxox   | xoxo   |        |        |        |
|        | oxox   | xoxo   |        | ← fifth printed row |
|        | xoxo   | oxox   |        |        |
|        | oxox   | xoxo   |        |        |
|        | xoxo   | oxox   |        |        |
|        |        | xoxo   | oxox   |        |
|        |        | oxox   | xoxo   |        |
|        |        | xoxo   | oxox   |        |
|        |        | oxox   | xoxo   |        |
|        |        |        | oxox   | xoxo   |
|        |        |        | xoxo   | oxox   |
|        |        |        | oxox   | xoxo   |
|        |        |        | xoxo   | oxox   |
|        |        |        |        | \| \|  |
|        |        |        |        | \| \|  |
|        |        |        |        | \| \|  |
|        |        |        |        | —      |

In both these diagrams—as in the basic "pattern 1" and "pattern 2" diagrams discussed just before, it can be seen by reading all the way across any row that after both passes at each row all positions in that row are filled—but by comparing the space- and sweep-rotation diagrams it will now be appreciated that the order in which some of the positions are filled in sweep rotation is opposite to that in which they are filled in space rotation. For example, in the fifth printed row the left-hand column is printed in the second pass (and the adjacent column left blank for printing later) in space rotation—but is printed in the third pass (after the adjacent column) in sweep rotation.

This can be shown more compactly by a different notation that allows comparison of space and sweep rotation side by side. In this notation, "0" represents nozzle groups that are not fired at all—at the top and bottom scans of the page—while "1" and "2" represent not individual pixel rows but rather half-swaths, in "pattern 1" and "pattern 2" as defined above.

| Space rotation | Sweep rotation |
|----------------|----------------|
| 0              | 0              |
| 1 2            | 1 2            |
|  1 2           |  2 1           |
|   1 2          |   1 2          |
|    1 2         |    2 1         |
|     1 2        |     1 2        |
|      0         |      0         |

Now in these abbreviated forms it is easier to see that within the printed image every half-swath receives one "1" and one "2"—but not always in the same order. Thus in the second half-swath the "1" goes down first in space rotation, but second in sweep rotation.

(f) Autorotating print-mode masks—Operating parameters can be selected in such a way that, in effect, rotation occurs even though the pen pattern is consistent over the whole pen array and is never changed between passes. Figuratively speaking this can be regarded as "automatic" rotation or simply "autorotation".

To understand what produces this condition, it is necessary first to take note of what constitutes a basic cell or unit of the print-mode mask, and then to note its height $h_c$ in pixels. It is also necessary to note the number of pixels (or the length measured in number of nozzles) by which the paper moves $m_p$ in each of its advances. For example, in the simple cases diagrammed above, since each mask repeats every two rows, $h_c=2$; and the paper advances by fifty nozzles at a time, so $m_p=50$ (or as in the abbreviated-notation diagram the paper advances four diagrammed nozzles at a time, so $m_p=4$).

The next step is to determine whether the ratio $m_p/h_c$ of these two parameters is integral. If so, as in this case, since $m_p/h_c=50/2=25$ actually (or $4/2=2$ as illustrated), the mask will not autorotate.

If however, in the two-pass example the paper advances by three diagrammed pixel rows instead of four—but the basic cell remains two pixels tall—then for this case as diagrammed the ratio $m_p/h_c=3/2$ is non-integral and at each pass the mask will "automatically" fill in the blank spaces left by the previous pass:

| pass 1 | pass 2 | pass 3 | pass 4 | pass 5 |
|--------|--------|--------|--------|--------|
| xoxo   |        |        |        |        |
| oxox   |        |        |        |        |
| xoxo   |        |        |        |        |
| oxox   | xoxo   |        |        |        |
| xoxo   | oxox   |        |        |        |
| oxox   | xoxo   |        |        |        |
|        | oxox   | xoxo   |        |        |
|        | xoxo   | oxox   |        |        |
|        | oxox   | xoxo   |        |        |
|        |        | oxox   | xoxo   |        |
|        |        | xoxo   | oxox   |        |
|        |        | oxox   | xoxo   |        |
|        |        |        | oxox   |        |
|        |        |        | xoxo   |        |
|        |        |        | oxox   |        |

(This diagrammatic example symbolizes a real case of, for instance, three passes, a total of ninety-six nozzles used in the pen, thirty-two nozzles used in each of three sections of the pen, thirty-two-nozzle printing-medium advance—and a basic-pattern cell three pixels tall. In algebraic notation, $m_p/h_c=32/3$, a nonintegral ratio. This three-pass mode is discussed in the next section.)

The print mode produced in this way is essentially a space-rotation mode (though in a sense that condition is not specifically called for). For example, if the pen is a six-row pen as diagrammed above, the first three rows are in "pattern 1" and the second three are in "pattern 2":

| xoxo |           |
| oxox | pattern 1 |
| xoxo |           |
|      |           |
| oxox |           |
| xoxo | pattern 2 |
| oxox |           |

For an autorotating case, either "pattern 1" or "pattern 2" may be used all down the pen. Thus the paper advance turns one simple pattern into a space-rotated mask "automatically". In the shorthand notation introduced above, the pen provides the following periodic behavior as the paper advances.

| autorotation |
|--------------|
| 0            |
| 1 2          |
|   1 2 |
|     1 2 |
|       1 2 |
|         0 |

(g) Three-pass modes—Heretofore, one highly favored print mode has specified a one-third-density-per-pass pattern that constructs dots in a diagonal pattern— xoo oxo oox

—rather than the one-half-density-per pass checkerboard modes discussed above. The diagonals, however, remain at forty-five degrees as in the checkerboard mode.

This pattern has been considered advantageous because it worked well with software dithering algorithms and had minimal tendency to create moire patterns when printing partial-density-shaded and gradient area fills. The use of forty-five-degree diagonals was considered particularly beneficial for its tendency to distribute error-hiding capability equally between vertical and horizontal axes of the pixel array to be constructed on the printing medium.

Generally a printing apparatus is characterized—through its basic hardware and firmware design architecture —by a general maximum-size print mask or mode pattern that can be formed with the apparatus in one pen pass; any mask pattern to be used with a printing apparatus must fit within its maximum pattern. For example, in a particular one printing device (of the Hewlett Packard Company) which produces high-quality images, that maximum mask or pattern size is eight rows tall and four columns wide—and will readily accommodate, among other possibilities, a mask that is three rows tall ($h_c=3$) and three columns wide.

Just such a mask produces the one-third-density diagonal three-pass pattern introduced at the beginning of this section. If that mask is used in conjunction with a unit paper advance of thirty-two nozzles—for a printing-medium advance movement $m_p=32$—then the previously introduced ratio $m_p/h_c=32/3$, which is not integral.

This combination of conditions accordingly provides autorotation of the three-row mask pattern shown above (as noted parenthetically in the preceding section). No mask rotation sequence is required; and a mask specification for the three passes accordingly might read "111" to indicate that the first column of the base pattern should be used in common to begin each sweep—that is, printing the pixel in column number one of the top row of the swath (assuming that there is any image information to print there). Equally well a mask specification might read "222" or "000", as indeed the pattern may begin with printing any of the three columns of the basic cell.

If instead the number of dot rows were an integral multiple of the pattern height, then as previously explained the printer would have to be instructed to use a rotation sequence telling it how to build the pattern in each succession of sweeps. For example, using the same three-row pattern but thirty-three-nozzle advance—which is to say, a printing-medium-advance movement of thirty-three dot rows—the ratio $m_p/h_c=33/3$ is integral, and a rotation sequence must be specified.

Such a sequence might be "012"—commanding the printer to form the first swath starting with the first column, number zero ("0") of the base pattern, the second swath starting with column number one ("1") of the base pattern, and the third with column two ("2") of the base pattern, as follows.

| pass 1 | pass 2 | pass 3 |
|--------|--------|--------|
| xoo    | oox    | oxo    |
| oxo    | xoo    | oox    |
| oox    | oxo    | xoo    |

-continued

| pass 1 | pass 2 | pass 3 | |
|--------|--------|--------|--|
| 0 | 1 | 2 | ← starting column of the base pattern |

The other equally acceptable sequences would be "021", "102", and all the other six rotations ("120", "201"; etc.) of these three root sequences. Now if a printer is stopped halfway through a page, using this cell and a diagrammatic six-dot-row paper advance, a pattern something like the following will be found—regardless of whether space or sweep rotation is in use.

```
xxxxxxxxxxxx         completely filled
xxxxxxxxxxxx
xxxxxxxxxxxx
xxxxxxxxxxxx
xxxxxxxxxxxx
xxxxxxxxxxxx xxoxxoxxoxxoxx       two-thirds filled
oxxoxxoxxoxxox
xoxxoxxoxxoxxo
xxoxxoxxoxxoxx
oxxoxxoxxoxxox
xoxxoxxoxxoxxo oxooxooxooxoox       one-third filled
ooxooxooxooxoo
xooxooxooxooxo
oxooxooxooxoox
ooxooxooxooxoo
xooxooxooxooxo
```

As before, this abbreviated diagram symbolizes the modernly more interesting practical case of thirty-three-nozzle advance. That case if fully pictured would appear as thirty-three rows fully filled, another thirty-three two-thirds filled, and thirty-three more one-third filled.

(h) Print-quality defects on transparency and glossy stock—As mentioned earlier, known techniques have not been entirely successful in eliminating bulk-colorant problems on transparent and other glossy media. Dividing the total desired amount of ink into three passes has been considered the limit for application of print-mode techniques in attempts to solve this problem.

As noted earlier, evaporation from these media—because they are relatively much less absorbent—is necessarily more important that from plain paper. Some evaporation can be obtained straightforwardly by convection (stimulated by an air-circulating fan), but inducing evaporation by applying radiative heat takes on greater importance with plastic media.

Heat, however, is most straightforwardly applied from below (the opposite direction from that of ink application). These media present more thermal mass and therefore an effectively longer thermal path than does plain paper.

Accordingly with these media a much greater fraction of applied heat radiation ends up absorbed in the printing medium as compared with the ink carrier; this adverse energy distribution is compounded by the previously mentioned dimensional hypersensitivity of these media to heat. Generally speaking, as can be seen from the foregoing discussion, the application of heat is more problematic for glossy and transparent stock than for plain paper.

Heretofore the lower liquid absorption, higher heat absorption, and higher dimensional sensitivity to heating, of these media has defied efforts to obtain adequate liquid removal. Accordingly the prior art has left considerable room for refinement in this area.

(i) Black-ink detail—Printing-machine users often prefer to present lettering and certain other types of finely detailed image elements in black, and the eye is capable of discerning black-inked elements (and defects in them) quite sensitively—as compared with elements and defects marked in other colors. It would therefore be desirable to use finer position control for black inking than for other colors, even within the same image.

Such a strategy, however, is difficult to implement. Generally speaking, the fineness of position control, or to put it another way the pitch of the pixel array, is commonly set by the frequency of a waveform derived by electrooptically reading, while the pen scans, a special scale extended across the printing medium.

Within a printing machine of reasonable cost it is preferable to employ multiplexing techniques for control of the pens. In other words, a single set of signal lines —and control signals time-sharing or otherwise coexisting in those lines—is used to operate all of the pens.

Providing finer position control for printing of black in direct conjunction with other colors would require somehow establishing a separate such waveform for black. That waveform would have to be provided simultaneously with the position-establishing waveform for the other colors—but at a different, higher frequency.

It would also require arranging for the signals of different frequencies to share the same basic position-signal transmitting system. These special provisions, to accommodate established multiplexing arrangements, would be awkward or at least costly. In engineering jargon, electrically it would be hard to "talk" to a color pen (for instance, a cyan pen) and a black pen at the same time.

An alternative would be to print black in a separate sweep, between sweeps for the chromatic-color pens. This alternative would pay a heavy price in reduced throughput and accordingly would be very undesirable.

(j) Conclusion—End-of-page print-quality defects on paper, as well as bulk-colorant problems on glossy and transparent media, heretofore have continued to impede achievement of uniformly excellent inkjet printing—at high throughput—on all industrially important printing media. Awkwardness of overprinting fine detail in black is another adverse limitation of the prior art. Thus important aspects of the technology used in the field of the invention remain amenable to useful refinement.

SUMMARY OF THE DISCLOSURE

The present invention introduces such refinement. In its preferred embodiments, the present invention has several aspects or facets that can be used independently, although they are preferably employed together to optimize their benefits.

In preferred embodiments of a first of its aspects, the invention is a method of printing desired images on a printing medium by construction from individual marks formed in pixel arrays. The marks are formed by a scanning print head that operates in conjunction with a printing-medium advance mechanism.

The method includes the step of scanning the head repeatedly along a pen-scanning axis that is substantially orthogonal to a printing-medium-advance axis. The method also includes the step of, during each scan of the head along the pen-scanning axis, forming marks in a pattern that approximates at least portions of a large number of generally parallel, separated lines that are relatively steeply angled relative to the pen-scanning axis and relatively shallowly angled relative to the printing-medium-advance axis.

This first facet or aspect of the invention also includes the steps of (1) during one or more earlier scans with respect to each segment of an image, leaving unprinted regions between the angled lines; and (2) during one or more later scans with respect to each segment, filling in the unprinted regions.

A second aspect of the invention differs from the first in that it expressly includes—instead of the two steps recited in the preceding paragraph:

forming the marks with a liquid-based colorant; and substantially concurrently with the mark-forming step, heating the medium to accelerate drying of the liquid-based colorant—this heating step having a tendency to create an end-of-page paper-shrink defect that accentuates positional error components parallel to the printing-medium-advance axis.

The relatively steeply angled lines have a tendency to minimize the positional error components parallel to the printing-medium-advance axis.

The foregoing may constitute descriptions or definitions of each of these two different facets of the invention in its broadest or more general form. Even in these general forms, however, it can be seen that these aspects of the invention significantly mitigate the difficulties left unresolved by the prior art.

In particular, the use of patterns with lines generally close in orientation to the paper-advance direction tends to minimize the conspicuousness of positional errors along that direction. This minimization of such errors in turn permits use of heat to accelerate drying of the print medium—and thereby facilitates operation at high throughput, but with minimal apparent degradation of image quality.

Although the features or characteristics expressly included in these two different aspects of the invention are subject to practice independently of each other, nevertheless as mentioned above they are preferably practiced together to maximize and optimize the benefits of the invention. In addition, they are preferably practiced in conjunction with certain other features or characteristics that further enhance enjoyment of overall benefits.

For example, it is preferred that the mark-forming step include placing marks only at selected pixel locations where marks are desired for construction of a particular such desired image. By virtue of this provision, the angled lines are incomplete where marks are not desired for construction of such particular desired image. Similarly it is preferred that the filling-in step include placing marks only at other selected pixel locations where marks are desired for construction of a desired image.

It is also preferred that the mark-forming step include forming the angled lines at substantially a steepest angle possible within design architecture of the scanning print head and printing-medium-advance mechanism. Stated more generally, it is preferred that the mark-forming step include forming the angled lines at substantially a steepest angle possible that:

is within design architecture of the scanning print head and print-medium-advance mechanism;

also provides at least approximately an equal number of marks per print-head scan, for desired images in which all pixel locations are to be marked;

does not contribute significantly to other types of error. Such other error types include, for example, interference with dithering patterns; and diagonal lines that are so vertical as to introduce significant print-quality aberrations relative to the print-head scanning axis.

Preferably the mark-forming step includes forming the angled lines at a slope much greater than 1:1 relative to the pen-scanning axis. Even more highly preferable is forming the angled lines at a slope of at least 2:1 relative to that axis. As will be seen, the specific pattern that is now most highly preferred provides a slope in the range of at least approximately 2.5:1 to 3:1—or very roughly 3:1—relative to the pen-scanning axis.

In this now-most-highly-preferred embodiment of the invention, the mark-forming step includes forming the angled lines in a basic pattern cell that is three pixels wide and eight pixels tall. Within this embodiment, advantageously during one of the scans the cell is printed with:

a mark in one column of the cell for each of three rows in direct succession;

a mark in another column of the cell for each of three other rows in direct succession; and a mark in still another column of the cell for each of two other rows in direct succession.

The same embodiment can be implemented in another way that is particularly advantageous in printing on glossy or transparent media. Here the total number of pen scans with respect to each segment of the image is multiple, i.e., a relatively high number, in any event greater than about four; and the mark-forming step comprises, during each of selected pairs of said multiple scans, printing the cell with:

two marks in one column of the cell for each of three rows in direct succession, two marks in another column of the cell for each of three other rows in direct succession, and two marks in still another column of the cell for each of two other rows in direct succession.

This manner of practicing the invention provides superior drying properties; if in addition the printing medium is advanced relative to the marking head between each pair of successive scans, of the multiple scans, then positional error along the direction of the medium-advance direction is relieved numerous times per swath, yielding very high image quality.

At least four and preferably more scans are needed to obtain the benefits of this manner of practicing the invention. The number of scans now regarded as most highly preferred is six.

In a third basic aspect or facet, the invention is an apparatus for printing desired images on a printing medium by construction from individual marks formed in pixel arrays. The apparatus includes some means for supporting such a printing medium; for purposes of generality and breadth in expressing the invention these means will be called simply the "supporting means".

The apparatus further includes a print head mounted for motion along a direction across the medium; and some means for scanning the head across the medium. Once again for breadth and generality these will be designated the "scanning means".

Also included are some means for providing relative motion of the printing medium with respect to the print head (the "relative-motion-providing means") along a direction of movement that is substantially orthogonal to the print head motion. The apparatus of this third facet of the invention also includes some means for heating the medium ("heating means"); and some means for forming marks in a particular pattern ("mark-forming means").

More specifically that pattern is one which was introduced in regard to the first two aspects of the invention. It is a pattern that approximates at least portions of a large number of generally parallel, separated lines that are relatively steeply angled relative to the print-head motion and relatively shallowly angled relative to the direction of relative movement of the printing medium with respect to the print head.

As to the apparatus of the third facet of the invention, the mark-forming means form this pattern while the relative-motion-providing means are not operating. In other words, while the pen forms a particular swath of dots or ink spots constituting a partially inked pixel array having the lines just described, there is no relative motion—along the orthogonal direction—of the printing medium with respect to the pen.

In preferred embodiments of a fourth of its aspects, the invention is a method of printing desired images on a low-liquid-absorption printing medium, by construction from individual marks formed in pixel column-and-row arrays by a scanning multiple-nozzle pen that operates in conjunction with a printing-medium advance mechanism. The method includes the step scanning the pen repeatedly along a pen-scanning axis across the medium, to place marks on the medium within a swath of pixel rows that is exposed to the multiple nozzles of the pen; in this system each nozzle corresponds to one pixel row.

The method also includes the step of periodically advancing the printing medium relative to the pen, along a printing-medium-advance axis that is substantially orthogonal to the pen-scanning axis, to bring a fresh portion of the medium within the swath that is exposed to the pen. The method further includes the step of, in each scanning of the head across the medium, firing at most one-third of the nozzles in each pixel-position column and thereby depositing, over the total number of scans at each pixel row, at least two drops of ink in each pixel position that is inked.

This method is thus in effect a double-density or 200% form of a six-pass printing mode, which has been found to effectuate a particularly advantageous balance between high quality and throughput. Indeed for optimum benefit this method is preferably practiced in conjunction with six printing-medium advances per full swath height.

As to preferred embodiments of a fifth of its aspects, the invention is similarly a method of printing desired images on a low-liquid-absorption printing medium, by construction from individual marks formed in pixel column-and-row arrays by a scanning multiple-nozzle pen that operates in conjunction with a printing-medium advance mechanism. This method too includes the step of scanning the pen repeatedly along a pen-scanning axis across the medium, to place marks on the medium within a swath of pixel rows that is exposed to the multiple nozzles of the pen, each nozzle corresponding to one pixel row; and periodically advancing the printing medium relative to the pen, along a printing-medium-advance axis that is substantially orthogonal to the pen-scanning axis, to bring a fresh portion of the medium within the swath that is exposed to the pen.

This method differs from that of the fourth aspect or facet of the invention, however, in that it includes the step of—in each scanning of the head across the medium —firing at most one-sixth of the nozzles in each pixel-position column. This method is thus more straightforwardly recognized as a six-pass printing mode, and like the fourth is preferably practiced with a one-sixth-swath advance distance.

A sixth aspect or facet of the invention is, in its preferred embodiments, a method of printing a desired image, which has two ends, on a printing medium by construction from individual marks formed in pixel column-and-row arrays by a scanning multiple-nozzle pen that operates in conjunction with a printing-medium advance mechanism. The printing medium is held taut beneath the pen between two sets of rollers except while printing near top and bottom edges of the printing medium, when it is constrained from only one direction by one of said sets of rollers.

This method includes the step of scanning the pen repeatedly along a pen-scanning axis across the medium, to place marks on the medium within a swath of pixel rows that is exposed to the multiple nozzles of the pen. Here as before, each nozzle corresponds to one pixel row.

In addition the method includes the step of—when the pen is not substantially at either end of the desired image, and while the medium is held taut between two sets of rollers—periodically advancing the printing medium relative to the pen, along a printing-medium-advance axis that is substantially orthogonal to the pen-scanning axis. Each such step operates to bring a fresh portion of the medium within the swath that is exposed to the pen, whereby the pen moves stepwise from one end of the image to the other.

The method also includes a further step that is performed when the pen is substantially at either end of the desired image, and at least until completion of full inking for the swath of pixel rows that is exposed to the nozzles of the pen. This step is holding the printing medium substantially stationary relative to the pen while performing a plurality of said scanning steps.

This step is performed at least if the medium is constrained from only one direction by one set of rollers. Preferably this step is performed only while the medium is constrained by one set of rollers, since its performance is less robust with respect to tolerance of nozzle failures; however, this step need not be strictly limited to performance under these conditions, as stationary-medium operation can also be performed in a generally satisfactory fashion at the end of the image even if the paper is still taut.

The method of this sixth facet of the invention is particularly beneficial in suppressing print-quality defects that arise from print-medium positioning errors due to mechanical tolerances. The method has this beneficial effect because—while the stationary-medium operation is being used—in fact no print-medium positioning takes place, and accordingly no error in positioning can occur.

Although this method even as thus broadly couched serves an excellent purpose, nevertheless preferably it is performed with certain additional features or characteristics. During the holding-stationary step, the scanning steps preferably include employing a sequence of print masks in rotation to progressively provide full inking for the swath of pixel rows that is exposed to the nozzles of the pen; and preferably that sequence of masks is such as to compensate for absence of printing-medium advance.

Also it is preferred that the mask-sequence-employing step comprise changing nozzle printing patterns between substantially every pair of scans of the pen.

All of the foregoing operational principles and advantages of the present invention will be more fully appreciated upon consideration of the following detailed description, with reference to the appended drawings, of which:

DETAILED DESCRIPTION OF THE PREFERRED EMBODIMENTS

1. STEEPER DIAGONAL

The print mask of the present invention forms diagonal lines that are skewed more toward the printing-medium advance direction than those of prior-art masks. This is beneficial because in this direction there tends to be more error due to paper advancement and paper shrinkage.

In at least some commercial printers the above-mentioned largest permissible pattern, within the basic architectural constraint of the printing apparatus that is in use, is rectangular and vertically oriented—in other words, longer in the direction of the printing-medium advance. In this case, preferably the diagonals formed by the invention approximate the longest diagonal line possible within that vertically oriented largest permissible pattern.

Within the previously mentioned eight-by-four pattern constraint of one Hewlett Packard printer, a particularly desirable print mode creates the following eight-by-three pattern cell or "base pattern".

```
xoo
xoo
xoo
oxo              base pattern
oxo                  or cell
oxo
oox
oox
012              ← column number within the base pattern
```

The resulting pattern still appears as diagonal lines when printed on the page, but now they are angled at roughly seventy degrees from the pen-scan axis—or, as it may be called, the "horizontal". The pattern alignment is now more vertical than horizontal, and this more effectively camouflages dot dislocation due to error in printing-medium shrinkage or advance.

The diagram above shows that within the eight-row cell or base pattern there are three rows of the repeating subpattern "xoo" and three of the subpattern "oxo", but only two of the bottom subpattern "oox". This asymmetry is without substantive consequence, or may possibly aid slightly in suppressing undesirable moire patterns and the like due to excessively regular cell structure.

The slope of the diagonal is probably best defined as the angle from any point (for example, the first dot) along the repeating unit to the same point on the next diagonally adjacent repeating unit. Using this definition, the slope is the ratio of eight vertical units to three horizontal units, or 8:3, corresponding to an angle of about 69½ degrees. Other reasonable candidate methods of defining the slope generally will yield comparable values between roughly 68 and 71½ degrees.

In any event it will be understood that the apparent slope of the diagonals created by this mask is roughly (within ten percent) 2.67—which is much greater than the 1:1 value provided by the checkerboard or three-by-three cells of the prior art. The angle of the diagonals relative to the pen-scan axis or "horizontal" is approximately (within three percent) seventy degrees.

While the invention in this preferable form accordingly is very beneficial, a great advance over the performance of the prior art in hiding paper-shrinkage and paper-advance errors can be enjoyed even with considerably less-emphatic vertical orientation. Any slope over about 2:1 (or angle over about sixty degrees), for instance, produces much better error-hiding properties than the 1:1 forty-five-degree diagonals of the prior art.

If the above-illustrated eight-dot-row pattern is used with a printing-medium advance of thirty-two nozzles, then the determining ratio $m_p/h_c$ is 32/8, which is integral —so the mode is not autorotating. Therefore the order in which the columns create the print patterns must be specified. The order normally is not critical. One acceptable sequence is shown in the following example.

| pass 1 | pass 2 | pass 3 | |
|---|---|---|---|
| 012 | 120 | 201 | ← internal rotation sequences |
| xoo | oox | oxo | |
| xoo | oox | oxo | |
| xoo | oox | oxo | |
| oxo | xoo | oox | |
| oxo | xoo | oox | |
| oxo | xoo | oox | |
| oox | oxo | xoo | |
| oox | oxo | xoo | ← last row in first cell |
| | | | |
| xoo | oox | oxo | ← starting next 8-row cell |
| xoo | oox | oxo | |
| xoo | oox | oxo | |
| oxo | xoo | oox | |
| . . . | | | |

These patterns correspond to a rotation sequence of "012". The phrase "rotation sequence" actually is used in two different senses, but as will be seen 012 is the rotation sequence for at least part of the above diagrams in both senses. (It will also be seen that the discussion above in section 2[g] of this document implicitly makes use of the second sense of "rotation sequence".)

One definition of "rotation sequence" is entirely internal to the cell—that is to say, the rotation sequence is the order in which pixel columns within the cell or basic pattern are printed. Thus "sequence 012" means that—as shown above for the first pass:

0 is the number of the column (column 0 is the first column) within the base pattern which is printed as the first column of the first pass;

1 is the column (the second column) within the base pattern which is printed as the second column of the first pass; and 2 is the number of the column (the third) within the base pattern which is printed as the third column of the first pass.

(As will be noted, in keeping with customary computer-science practice the columns are numbered starting with zero.) Correspondingly for the second pass, as marked in the tabulation above, the (internal) rotation sequence is 120; and for the third pass the sequence is 201. When used in this first sense, a separate "rotation sequence" code can be meaningfully specified for each pass, as indicated above next to the label "←internal rotation sequence".

The other sense in which the phrase "rotation sequence" is used is partly external to the base pattern. Here the rotation sequence identifies a series of swath or pass numbers in which the consecutive columns of the base pattern are used in starting positions, so defining the swath pattern: thus in the tabulated case, swath number:

0 (the first pass) is assigned to begin with the first column of the base pattern;

1 (the second swath) takes the second column of the base pattern for its beginning column; and 2 (the third) uses the third column of the base pattern as the first column of the swath. Using this second sense of the phrase "rotation sequence", the entire three-pass pattern shown above is characterized as "012". (It is not meaningful to characterize each pass with a separate "rotation-sequence" in this sense.)

Now if the printer is stopped halfway down a page, a pattern generally like the following abbreviated diagram can be seen (not starting at the left-hand edge of the image)—except that the eight-nozzle cell shown above repeats four times within each swath, rather than occurring only once as suggested by the diagram. Due to this repetition the height of each band of fill, measured in number of nozzles, is thirty-two dot rows rather than eight as diagrammed.

```
xxxxxxxxxxxx        completely filled
xxxxxxxxxxxx
xxxxxxxxxxxx
xxxxxxxxxxxx
xxxxxxxxxxxx
xxxxxxxxxxxx
xxxxxxxxxxxx
xxxxxxxxxxxx oxxoxxoxxoxxo      two-thirds filled
oxxoxxoxxoxxo
oxxoxxoxxoxxo
xoxxoxxoxxoxx
xoxxoxxoxxoxx
xoxxoxxoxxoxx
xxoxxoxxoxxox
xxoxxoxxoxxox oxooxooxooxoo      one-third filled
oxooxooxooxoo
oxooxooxooxoo
ooxooxooxooxo
ooxooxooxooxo
ooxooxooxooxo
xooxooxooxoox
xooxooxooxoox
```

Another potentially useful cell might be an eight-by-four pattern—the maximum permitted within the system architecture mentioned earlier. Such a cell contains thirty-two pixels, which cannot be divided up equally among three passes.

Equal division among the number of passes selected is desirable to avoid other types of artifacts. This principle might suggest that an eight-by-four pattern would work moderately well with four passes; but for best throughput on plain paper four passes is less desirable because it would be slower.

Also the slope in that case would be definitely 8:4=2 (an angle of about sixty degrees). That slope would be a distinct improvement over the prior art—but has not been tested, and possibly would be noticeably less effective than 8:3 in hiding vertically oriented errors. For these various reasons an eight-by-four cell is now regarded as at least no more advantageous—and possibly less advantageous—than an eight-by-three.

2. SIX PASSES FOR PLASTIC MEDIA

As mentioned earlier, in the prior art three print passes were considered ideal. The present invention, however, recognizes that the number of passes used by a system represents a tradeoff between throughput and quality (particularly distribution of paper-advance error over a large number of passes so as to hide that error).

Thus in principle, if only quality were needed, each swath could be printed using a thousand pen passes, with one ink spot deposited in each pass; this print mode might produce virtually flawless images but also might require an hour per page. Typical draft-mode printing does the opposite—laying down an entire swath in just one pass.

The present invention further recognizes that in balancing throughput and quality, it is desirable to take into account the properties of different media. In other words, the ideal compromise may call for a different number of passes with some media than with other media.

In accordance with the present invention, for use on transparent and glossy media, six passes has been found highly preferable to three. A higher number of passes is more optimal for glossies and transparencies than for paper because—as explained in the "PRIOR ART" section of this document—in practice the other parameters (quantity of heat, and effectiveness of convection and absorption) used to mitigate bulk-colorant problems cannot be set as high for these media as for paper.

To put it another way, the present invention proceeds from the recognition or discovery that the drying characteristics of these media shift the optimum tradeoff point toward a greater number of printing passes.

Different numbers of ink drops of the various primaries are desirable for these two different media types respectively. In this regard the ink application considered ideal is quite complicated—encompassing use of fractional average numbers of drops for certain colorants. These best-known modes of practice of the invention are set forth in considerable detail in the Askeland et al. document identified above.

In addition to using six passes and employing the inking arrangements set forth in that document, it is also highly preferable to incorporate the maximum-diagonal aspects of the invention described in the preceding section. The basic three-pass eight-row cells are in essence repeated, making two passes over every pixel location rather than one—to provide double density.

In addition it is highly preferred to halve the advance distance. Thus whereas the three-pass embodiment of the invention is now believed to operate ideally with advance by thirty-two pixel rows (about 32/24=1.33 mm) at each step, the six-pass embodiment operates instead with advance by sixteen rows (16/24=0.67 mm) per step.

The resulting masking patterns may appear as shown.

| pass 1 | pass 2 | pass 3 | pass 4 | pass 5 | pass 6 |
|--------|--------|--------|--------|--------|--------|
| xoo | oox | oxo | xoo | oox | oxo |
| xoo | oox | oxo | xoo | oox | oxo |
| xoo | oox | oxo | xoo | oox | oxo |
| oxo | xoo | oox | oxo | xoo | oox |
| oxo | xoo | oox | oxo | xoo | oox |
| oxo | xoo | oox | oxo | xoo | oox |
| oox | oxo | xoo | oox | oxo | xoo |
| oox | oxo | xoo | oox | oxo | xoo |
| 012 | 120 | 201 | 012 | 120 | 201 |
| | (rotation sequence) | | | | |

If as before the printer is halted partway down a page the developing pattern can be seen from the following representative rows. Capital letters represent double inking:

```
XXXXXXXXXXXXXXX    200% filled,
XXXXXXXXXXXXXXX         after passes 1 through 6
XXXXXXXXXXXXXXX
```

-continued

```
XXXXXXXXXXXXXX
XXXXXXXXXXXXXX
XXXXXXXXXXXXXX
XXXXXXXXXXXXXX
XXXXXXXXXXXXXX
```

```
xXXxXXxXXxXXxXX       167% filled,
xXXxXXxXXxXXxXX           after passes 2 through 6
xXXxXXxXXxXXxXX
XxXXxXXxXXxXXxX
XxXXxXXxXXxXXxX
XxXXxXXxXXxXXxX
XXxXXxXXxXXxXXx
XXxXXxXXxXXxXXx
```

```
xXxxXxxXxxXxxXx       133% filled,
xXxxXxxXxxXxxXx           after passes 3 through 6
xXxxXxxXxxXxxXx
xxXxxXxxXxxXxxX
xxXxxXxxXxxXxxX
xxXxxXxxXxxXxxX
XxxXxxXxxXxxXxx
XxxXxxXxxXxxXxx
```

```
xxxxxxxxxxxxxx        100% filled,
xxxxxxxxxxxxxx            after passes 4 through 6
xxxxxxxxxxxxxx
xxxxxxxxxxxxxx
xxxxxxxxxxxxxx
xxxxxxxxxxxxxx
xxxxxxxxxxxxxx
xxxxxxxxxxxxxx
```

```
oxxoxxoxxoxxoxx       67% filled,
oxxoxxoxxoxxoxx           after passes 5 and 6
oxxoxxoxxoxxoxx
xoxxoxxoxxoxxox
xoxxoxxoxxoxxox
xoxxoxxoxxoxxox
xxoxxoxxoxxoxxo
xxoxxoxxoxxoxxo
```

```
oxooxooxooxooxo       33% filled,
oxooxooxooxooxo           after pass 6 only
oxooxooxooxooxo
ooxooxooxooxoox
ooxooxooxooxoox
ooxooxooxooxoox
xooxooxooxooxoo
xooxooxooxooxoo
```

The inking arrangements outlined above provide double-drop-per-pixel coverage of all pixel positions. For primary colors (in preferred embodiments those are cyan, magenta and yellow), this is a now-preferred treatment for images on transparency or glossy stock as well as on paper.

In accordance with the aforementioned Askeland document, however, it may be preferable to ink certain pixel positions more than two times, for example three times, in a single image—or through use of spatial averaging arrangements to provide a mean deposition of fractional drops. More-than-double fractional inking has been found particularly useful for secondary colors (red, green and blue in preferred embodiments) on transparency and glossy stock—and can be achieved by, for instance, "stripping" selected data bits from the pattern.

Preferably such data stripping is introduced starting in the fourth pass (pass 4 in the tabulation above). As an example, suppose that a particular pixel is to receive 2.5 dots, on the average, of red ink.

In other words, in half of the passes that pixel is to receive one yellow and one magenta (symbolized "YM") and in the other half of the passes it is to receive one yellow and two of magenta (YMM), instead of the simplest-case four dots (YMYM). To implement this plan, that pixel would receive the first "YM" in the first three passes; and in the remaining passes that pixel would be given a single-bit-stripped treatment to add one more dot of magenta and so yield YMM.

Secondaries ordinarily in each position receive two drops (one of each of two different colors), so by this treatment secondaries if not data-stripped would receive four. Colors produced in this way are very rich, but such excess colorant deposition produces blocking etc. as described earlier; an extra alternating firmware switch or so-called "filter" can be put into operation to suppress or strip the alternate drops.

The result can be tailored to produce either two or four drops at selected pixels—and thus three, or two and a half, etc. per position on the average. Further detail appears in the Askeland document.

If in addition to inking each swath in six passes the printing medium is advanced relative to the pen after each pass—in other words, if the medium is advanced six times per swath—then besides improved drying the invention also relieves medium-advance-direction positioning error each one-sixth swath.

That is, advance errors are smaller since the step size is only half as large (0.67 mm rather than 1.33 mm); and the advance errors are averaged over six advances rather than only three. In addition to these benefits, six-pass modes as outlined above facilitate use of fractional-dot techniques to optimize hue and chroma for each color and printing medium.

An overall result of a six-pass method is to balance the need for high quality and high throughput. Although taking more passes (eight, twelve, etc.) would accomplish the same or better quality goals, throughput would be significantly degraded. Conversely, as mentioned earlier four, or preferably more than four, passes will produce some improvement in quality and are considered within the scope of certain of the appended claims, but the quality provided by six passes is believed to be significantly better.

3. DOUBLE-FREQUENCY BLACK ON RETRACE

It has been found that finer control of black inking at high throughput can be provided with reasonable economy through use of a higher-frequency positioning waveform for black—and actual printing of black—only during each return sweep of the pen. The return pass of the pen is known as the "retrace".

An additional interpolation stage can be put into operation—and the resulting signal transmitted on the pen signal bus—straightforwardly on retrace. As no other precise-pen-position signals are in use then, there is no interference with control signals for other colors.

Preferably the position waveform for black on retrace is at twice the frequency used for other colors on the forward sweep. The result is twice as many pixel positions— with corresponding ability to represent finer detail—and the pen discharge signals can be correspondingly adjusted to make the resulting ink spots smaller.

Whereas a pixel spacing of about twelve per millimeter (three hundred dots per inch) is appropriate for the color-ink spots, the double-frequency black-ink positioning signal produces a spacing of about twenty-four dots per millimeter (six hundred per inch). In printing of text alone, in black and without any color printing, the higher frequency and the finer pixel spacing are preferably used in both directions rather than only on retrace.

While this system of printing black on retrace, when it is part of a color image, resolves the difficult problem of multiplexing different pens that are operating at different frequencies, other factors too militate in favor of this method. One such factor is that positional precision in bidirectional operation is in fact adequate for such operation;

this high precision is obtained through use of a related invention disclosed in the previously mentioned document of Raskin et al.

Another factor is that this system very significantly enhances throughput, as the time required to print black on retrace is considerably less than the time required to print black in a separate forward sweep plus the time required for two nonprinting return slews. This advantage is particularly notable in comparison with the major alternative of printing black in a separate forward sweep, between color passes.

4. SUMMARY OF PRINT MODES

In its most highly preferred practice, the invention makes use of several different, complicated combinations of operating parameters and characteristics to accommodate various operating requirements. These combinations are summarized below.

| mode | passes | thru-put pg/min | RET | di-rec-tions | scan speed cm/sec | re-trace cm/sec | max. freq. kHz CMY | K | split text |
|---|---|---|---|---|---|---|---|---|---|
| PAST: | | | | | | | | | |
| text | 1 | 6 | no | bi | 67.6 | 67.6 | | 8 | OK |
| graphics | 1 | 1.4 | no | uni | 33.8 | 88.9 | 4 | | |
| NORMAL: | | | | | | | | | |
| text | 1 | 6 | no | bi | 67.6 | 67.6 | | 8 | no |
| graphics | 3 | 0.56 | no | uni | 50.8 | 88.9 | 2 | 2 | |
| HIGH QUALITY: | | | | | | | | | |
| text | 1 | 4 | yes | bi | 33.8 | 33.8 | | 8 | no |
| graphics | 3 | 0.45 | yes | bi: | 50.8 | 50.8 | 2 | 4 | |
| | | | | - color forward; - black on retrace | | | | | |
| TRANSPARENCY: | 6 | 0.33 | no | uni | 50.8 | 88.9 | 2 | 2 | |
| GLOSSY: | 6 | 0.33 | no | uni | 50.8 | 88.9 | 2 | 2 | |

In this tabulation, the column heading "RET" represents "resolution-enhanced technology"—the system described above in which black is printed at a pixel spacing of twenty-four pixels per millimeter along the pen-scan axis, rather than the standard twelve. In the preferred system described here, the pixel spacing along the printing-medium-advance axis remains twelve whether RET is in use or not.

The column heading "densitom." refers to a subsystem by which the firmware preevaluates on a swath-by-swath basis the optical density of image areas not yet reached in actual printing—but to be printed soon. If the optical density (and therefore quantity of ink) will shortly be high, then the printing is decelerated gradually to accommodate the anticipated higher drying demands while at the same time avoiding abrupt speed-change-generated image discontinuities. In fast and normal modes the turn-on threshold is much higher and the slowdown is much smaller than those used for high-quality mode.

The column headings "CMY" and "K" refer to ink color: CMY represents the chromatics cyan, magenta and yellow respectively; and K represents black. The machine preferably switches to three-pass "graphics" printing automatically in normal or high-quality mode whenever (a) the swath contains color or (b) black text or graphics cross the swath boundary. The sole distinction between single-pass "text" printing as between the fast and normal modes appears in the right-hand column: only in the fast mode is text split.

As drying of transparencies and glossy media must rely more heavily upon convection, a drying fan is operated in those modes.

5. HARDWARE FOR IMPLEMENTING THE INVENTION

Figure 1:
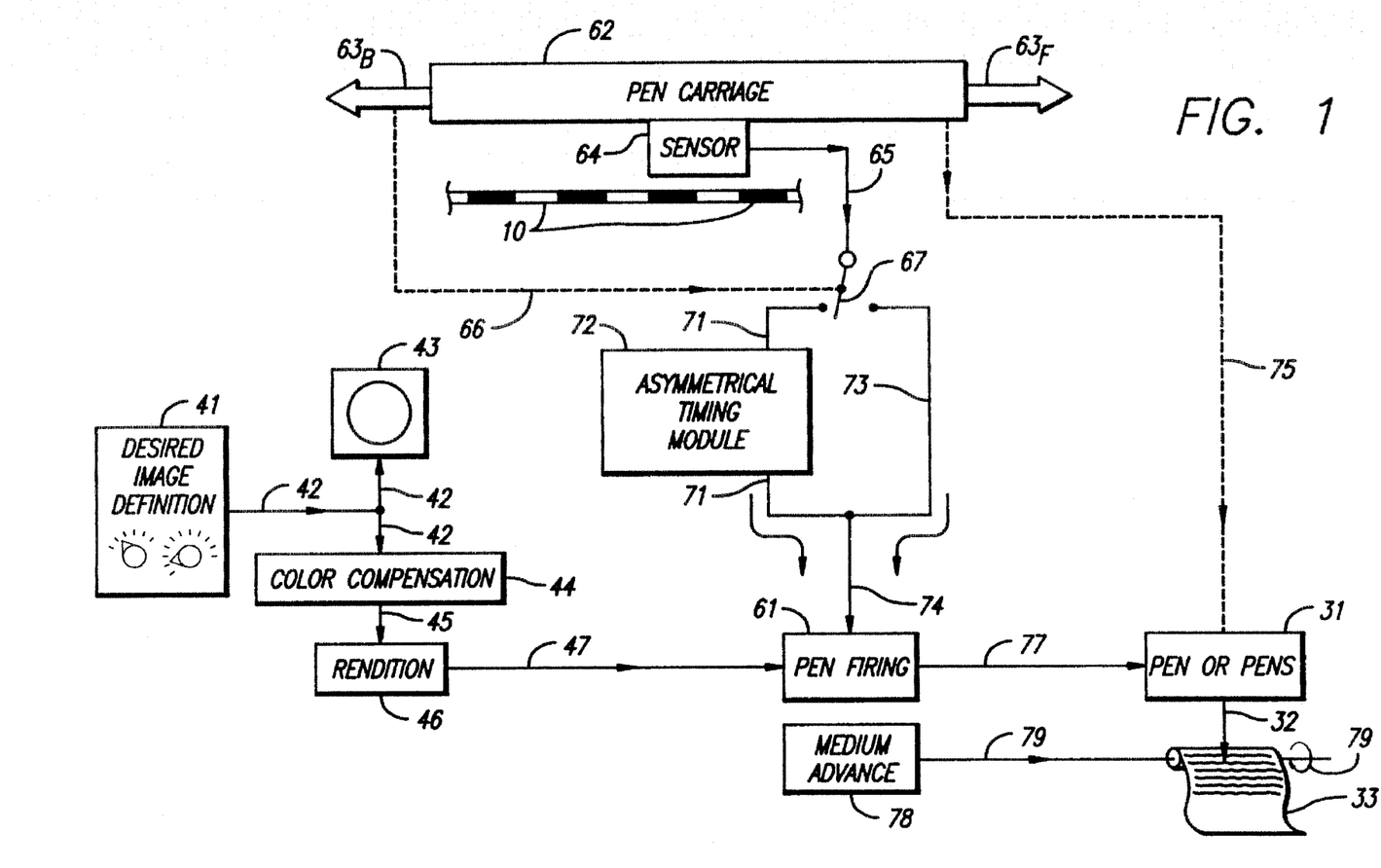
FIG. 1 is a block-diagrammatic representation of a hardware system according to the invention.

FIG. 1 illustrates the general preferred layout of a programmed-microprocessor-based printing machine according to the invention. An input stage 41, which may include manual controls, provides information defining the desired image. The output 42 of this stage may proceed to a display 43 if desired to facilitate esthetic or other such choices; and, in the case of color printing systems, to a color-compensation stage 44 to correct for known differences between characteristics of the display 43 and/or input 41 system vs. the printing system 47-61-31-32-33.

An output 45 from the compensator 44 proceeds next to a rendition stage 46 that determines how to implement the desired image at the level of individual pixel-position printing decisions—for each color, if applicable. The resulting output 47 is directed to a circuit 61 that determines when to direct a firing signal 77 to each pen 31.

The pens discharge ink 32 to form images on paper or some other printing medium 33. Meanwhile typically a medium-advance module 78 provides relative movement 79 of the medium 33 in relation to the pens 31.

In developing its firing-signal determination, the firing circuit 61 must take into account the position of the pen carriage 62, pen mount 75 and pen 31. Such accounting is enabled by operation of an electrooptical sensor 64 that rides on the carriage 62 and reads a code-strip 10.

A timing module 72 is positioned in the line between the sensor 64 and firing circuit 61. The timing module 72 provides for various special positioning functions, including encoder-signal inversion or equivalent, during scanning in one of two directions.

It also provides for backing off by one pulse and then delay in pen firing, also during scanning in one of two directions. Most particularly for purposes of the present invention the timing module 72 switches into use the interpolated, double-frequency positioning signal mentioned above, for use only in printing black on retrace, when colors are being printed in the alternating forward sweeps. (As noted earlier, this signal is also used in printing black bidirectionally, when colors are not being printed; but in this case the use of the interpolated signal is not switched by the timing module.)

Operation of this timing module 72 thus is not desired at all times, but rather only synchronously with the directional reversals of the carriage 62. Specifically, the timing module 72 is to be inserted during operation in one direction only, and replaced by a straight-through bypass connection 73 during operation in the other direction —in other words, operated asymmetrically—and this is the reason the timing module 72 is labelled in FIG. 1 "asymmetrical".

This synchronous insertion and removal is symbolized in FIG. 1 by a switch 67 which selects between the conventional connection 73 and a timing-module connection 71. This switch 67 is shown as controlled by a signal 66 that is in turn derived from backward motion $63_B$ of the pen carriage 62.

Thus the switch 67 is operated to select the timing-module connection 71 during such backward motion $63_B$, and to select the bypass or conventional route 73 during forward motion $63_F$. This representation is merely symbolic for tutorial purposes; people skilled in the art will understand that the switch 67 may not exist as a discrete physical element, and/or may instead be controlled from the forward motion $63_F$ and/or—as will much more commonly be the case—can be controlled by some upstream timing signal which also controls in common the pen-carriage motion $63_B$, $63_F$. Further the synchronous switch 67 need not be at the input side of the timing module 72 but instead at the output side—where in FIG. 1 a common converging signal line 74 is shown as leading to the firing circuit 61—or may in effect be at both sides.

Use of a system as illustrated in FIG. 1, at least as most naturally interpreted, will result in the encoder-signal inversion, the pulse "backing off" step and the firing delay step all being performed during pen motion in the same, common ("backward") direction. This limitation while preferred is not required for successful practice of the invention.

6. TOP/BOTTOM-OF-PAGE MASK ROTATION ONLY

At the bottom of each sheet of print medium, a relatively tall region, that may be called the bottom-of-page "handoff" zone, is defined by the distance between sets of rollers that hold the medium taut. As noted earlier—and as explained in greater detail in the above-mentioned Broder et al. document—preferably for printing on paper in this region the printing-medium advance height is lowered to half (FIG. 2c) its normal midpage value (FIG. 2b).

Figures 2A, 2B, 2C, 2D:
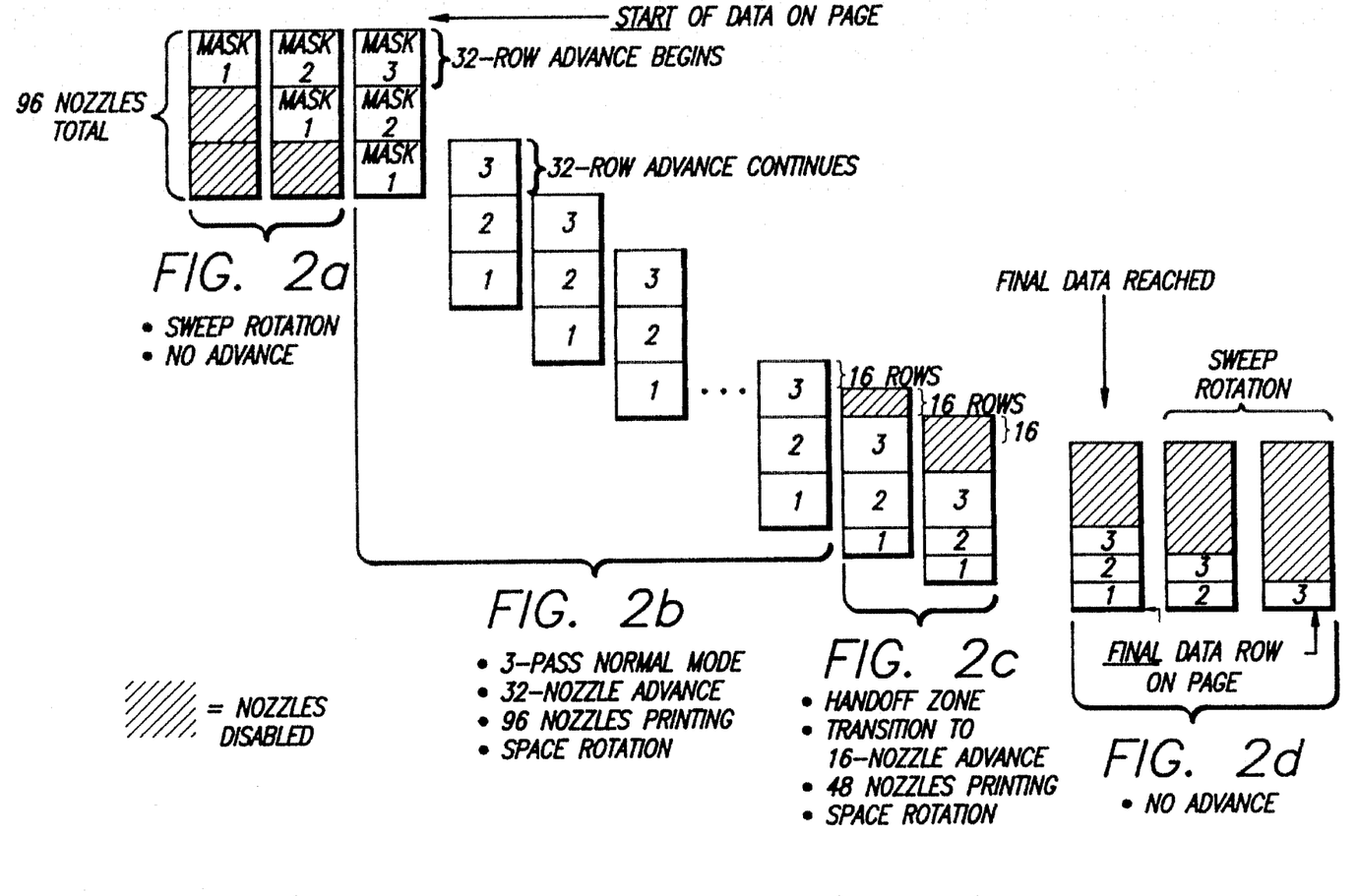
FIGS. 2a through 2d are diagrammatic print-mask representations of inking patterns used in, respectively: (a) special top-of-page sweep mask rotation to enable suppression of printing-medium advance in that region, (b) midpage space rotation with one-third advance, (c) bottom-of-page handoff space rotation with one-sixth advance, and (d) special bottom-of-page sweep rotation to enable suppression of advance in that region.

For example, in a preferred embodiment each pen has ninety-six nozzles and so makes a ninety-six-pixel swath; the normal advance distance (except for plastic media, per this invention) is one third of this height, or thirty-two pixels—1.33 mm, for a preferred pixel spacing of 1/24 mm (FIG. 2b). When the medium cannot be tensioned, as set forth by Broder et al. the advance preferably is halved to sixteen pixels or about 0.7 mm (FIG. 2c).

In shallower end zones consisting of the single top (FIG. 2a) and bottom (FIG. 2d) swaths on each sheet of medium, however, according to the present invention the advance height is reduced to zero—i.e., eliminated entirely. This is done when the pen (or set of pens) is at either end of the data, but most preferably only if that occurs while the medium is untensioned—either in the "handoff" zone or an analogous one at the top.

This operating mode is particularly important when the pen is actually printing along the top or bottom edge of the sheet. Ordinarily good performance is not obtained with the pen skimming partly on and partly off the edge, but space rotation would demand starting or ending in just that condition, to provide three or six passes in a fractional-swath zone along the edge. Under these circumstances, since space rotation can no longer be made to occur, in effect, as a consequence of print-medium advance, it is provided through sweep rotation—changing the inking pattern between pen scans.

On each page the mask is first sweep-rotated on the pen by firmware, for the first two sweeps, while the pen is stationary (FIG. 2a); then the mask is fixed on the pen and paper advance begins (FIG. 2b), producing space rotation —that is, the mask does not change relative to the pen—and most of the page is printed in this normal three-pass mode. In the handoff zone, but not yet at the end of data, the system makes a transition to one-sixth advance, and only half (forty-eight) of the nozzles print, but the mask is still space rotated (FIG. 2c). When final data are reached, advance again halts and the remaining two passes are flushed out— with firmware sweep-rotating the mask (FIG. 2d).

The above disclosure is intended as merely exemplary, and not to limit the scope of the invention—which is to be determined by reference to the appended claims.

What is claimed is:

1. A method of printing desired images on a low-liquid-absorption printing medium, by construction from individual marks formed in pixel column-and-row arrays by a scanning multiple-nozzle pen that operates in conjunction with a printing-medium advance mechanism; said method comprising the steps of:

scanning the pen repeatedly along a pen-scanning axis across the medium, to place marks on the medium within a swath of pixel rows that is exposed to the multiple nozzles of the pen, each nozzle corresponding to one pixel row;

periodically advancing the printing medium relative to the pen, along a printing-medium-advance axis that is substantially orthogonal to the pen-scanning axis, to bring a fresh portion of the medium within the swath that is exposed to the pen; and in each scanning of the head across the medium, firing at most one-third of the nozzles in each pixel-position column and thereby depositing, over the total number of scans at each pixel row, at least two drops of ink in each pixel position that is inked.

2. The method of claim 1, wherein:

for portions of a desired image in which a mark is desired in every pixel position, the firing step comprises firing substantially one-third of the nozzles in substantially every pixel-position column.

3. The method of claim 2, wherein:

the medium-advancing step comprises advancing the medium between substantially every pair of scans of the pen.

4. The method of claim 2, wherein:

the medium-advancing step comprises advancing the medium by a number of pixel rows equal to substantially one-sixth of the number of operating nozzles of the pen, between substantially every pair of scans of the pen.

5. The method of claim 1, wherein:

the medium-advancing step comprises advancing the medium by a number of pixel rows equal to substantially one-sixth of the number of operating nozzles of the pen, between substantially every pair of scans of the pen.

6. The method of claim 1, wherein:

the medium-advancing step comprises advancing the medium by a number of pixel rows equal to an integral multiple of one-sixth of the number of operating nozzles of the pen, between substantially every pair of scans of the pen.

7. A method of printing desired images on a low-liquid-absorption printing medium, by construction from individual marks formed in pixel column-and-row arrays by a scanning multiple-nozzle pen that operates in conjunction with a printing-medium advance mechanism; said method comprising the steps of:

scanning the pen repeatedly along a pen-scanning axis across the medium, to place marks on the medium within a swath of pixel rows that is exposed to the multiple nozzles of the pen, each nozzle corresponding to one pixel row;

periodically advancing the printing medium relative to the pen, along a printing-medium-advance axis that is substantially orthogonal to the pen-scanning axis, to bring a fresh portion of the medium within the swath that is exposed to the pen; and in each scanning of the head across the medium, firing at most one-sixth of the nozzles in each pixel-position column.

8. The method of claim 7, wherein:

for portions of a desired image in which a mark is desired in every pixel position, the firing step comprises firing substantially one-sixth of the nozzles in substantially every pixel-position column.

9. The method of claim 8, wherein:

the medium-advancing step comprises advancing the medium between substantially every pair of scans of the pen.

10. The method of claim 8, wherein:

the medium-advancing step comprises advancing the medium by a number of pixel rows equal to substantially one-sixth of the number of operating nozzles of the pen, between substantially every pair of scans of the pen.

11. The method of claim 7, wherein:

the medium-advancing step comprises advancing the medium by a number of pixel rows equal to substantially one-sixth of the number of operating nozzles of the pen, between substantially every pair of scans of the pen.

12. The method of claim 7, wherein:

the medium-advancing step comprises advancing the medium by a number of pixel rows equal to an integral multiple of one-sixth of the number of operating nozzles of the pen, between substantially every pair of scans of the pen.

13. A method of printing a desired image, which has two ends, on a printing medium by construction from individual marks formed in pixel column-and-row arrays by a scanning multiple-nozzle pen that operates in conjunction with a printing-medium advance mechanism; said printing medium being held taut beneath the pen except while printing near top and bottom edges of the printing medium, when it is constrained from only one direction; said method comprising the steps of:

scanning the pen repeatedly along a pen-scanning axis across the medium, to place marks on the medium within a swath of pixel rows that is exposed to the multiple nozzles of the pen, each nozzle corresponding to one pixel row;

when the pen is not substantially at either end of the desired image, and while the medium is held taut, periodically advancing the printing medium relative to the pen, along a printing-medium-advance axis that is substantially orthogonal to the pen-scanning axis, to bring a fresh portion of the medium within the swath that is exposed to the pen; whereby the pen moves stepwise from one end of the image to the other; and when the pen is substantially at either end of the desired image, at least if the medium is constrained from only one direction and at least until completion of full inking for the swath of pixel rows that is exposed to the nozzles of the pen, holding the printing medium substantially stationary relative to the pen while performing a plurality of said scanning steps; and wherein:

the periodically-advancing step comprises advancing the printing medium between substantially every pair of scans of the pen.

14. A method of printing a desired image, which has two ends, on a printing medium by construction from individual marks formed in pixel column-and-row arrays by a scanning multiple-nozzle pen that operates in conjunction with a printing-medium advance mechanism; said printing medium being held taut beneath the pen except while printing near top and bottom edges of the printing medium, when it is constrained from only one direction; said method comprising the steps of;

scanning the pen repeatedly along a pen-scanning axis across the medium, to place marks on the medium within a swath of pixel rows that is exposed to the multiple nozzles of the pen, each nozzle corresponding to one pixel row;

when the pen is not substantially at either end of the desired image, and while the medium is held taut, periodically advancing the printing medium relative to the pen, along a printing-medium-advance axis that is substantially orthogonal to the pen-scanning axis, to bring a fresh portion of the medium within the swath that is exposed to the pen; whereby the pen moves stepwise from one end of the image to the other; and when the pen is substantially at either end of the desired image, at least if the medium is constrained from only one direction and at least until completion of full inking for the swath of pixel rows that is exposed to the nozzles of the pen, holding the printing medium substantially stationary relative to the pen while performing a plurality of said scanning steps; and wherein:

during the holding-stationary step, said scanning steps comprise employing a sequence of print masks in rotation to progressively provide full inking for the swath of pixel rows that is exposed to the nozzles of the pen; and said sequence of masks is such as to compensate for absence of printing-medium advance.

15. The method of claim 14, wherein:

the mask-sequence-employing step comprises changing nozzle printing patterns between substantially every pair of scans of the pen.

16. The method of claim 15, wherein:

each said scanning step comprises firing at most one-third of the nozzles in each pixel-position column and thereby depositing, over the total number of scans at each pixel row, at least two drops of ink in each pixel position that is inked.

17. The method of claim 15, wherein:

each said scanning step comprises firing at most one-sixth of the nozzles in each pixel-position column.

* * * * *